US006380283B1

(12) United States Patent
Perrella et al.

(10) Patent No.: US 6,380,283 B1
(45) Date of Patent: Apr. 30, 2002

(54) ENZYME, STABILIZER AND ANTIOXIDANT TREATED NATURAL RUBBER LATEX PRODUCT AND METHOD OF PROCESSING SAME

(75) Inventors: Frank W. Perrella, Amherst, NH (US); Joseph K. Pieroni, Newport, RI (US); Thomas N. Tillotson, Dixville Notch, NH (US)

(73) Assignee: Tillotson Healthcare Corporation, Bedford, NH (US)

( * ) Notice: Subject to any disclaimer, the term of this patent is extended or adjusted under 35 U.S.C. 154(b) by 0 days.

(21) Appl. No.: 09/447,995

(22) Filed: Nov. 23, 1999

(51) Int. Cl.⁷ .................................................. C08K 5/42
(52) U.S. Cl. ...................... 524/31; 524/156; 524/157; 524/158; 524/575.5
(58) Field of Search .............................. 524/575.5, 156, 524/157, 158, 31

(56) References Cited

U.S. PATENT DOCUMENTS

| 2,097,481 A | 11/1937 | Wallerstein |
| 4,160,726 A | 7/1979 | DelPico ........................ 210/23 |
| 4,638,028 A | 1/1987 | Lui et al. ..................... 524/387 |
| 5,272,771 A | 12/1993 | Ansell et al. .................. 2/167 |
| 5,563,241 A | 10/1996 | Beezhold ..................... 528/482 |
| 5,569,740 A | 10/1996 | Tanaka et al. ............... 528/502 |
| 5,580,942 A | 12/1996 | Cornish .......................... 528/1 |
| 5,610,212 A | 3/1997 | Tanaka et al. ............... 524/156 |
| 5,612,083 A | 3/1997 | Haung et al. ................ 264/233 |
| 5,622,998 A | 4/1997 | Tanaka et al. ................. 521/41 |

FOREIGN PATENT DOCUMENTS

| EP | 0584597 | 3/1994 | ............. C08C/1/04 |
| EP | 0624601 | 11/1994 | ............. C08C/1/14 |
| EP | 0630907 | 12/1994 | ............. C08C/1/06 |
| GB | 2098222 | 11/1982 | ............. C08C/1/14 |
| JP | 126436 | 5/1995 | ............. C08L/7/02 |
| JP | 967402 | 3/1997 | ............. C08C/1/04 |
| WO | 9628500 | 9/1996 | ............. C08J/5/02 |
| WO | 9701581 | 1/1997 | ............. C08C/1/04 |

OTHER PUBLICATIONS

F.W. Perrella, Ph.D., Enzyme–Treated Natural Rubber Latex: Concept to Product, International Latex Conference, Jul. 27–28, 1999.

F.W. Perrella, Ph.D., Enzyme–Treated Natural Rubber Latex: A Practical Approach, International Latex Conference, Jul. 21–22, 1998.

Nor Aisah AB. Aziz, Formulations for Heat Resistant Chlorinated Medical Gloves, Workshop on "Latex Protein Allergy", Jun. 9, 1994.

Primary Examiner—Edward J. Cain
(74) Attorney, Agent, or Firm—Bourque & Associates, PA (57) ABSTRACT

A method of treating natural rubber latex to reduce the antigenic protein content includes enzyme treatment of the natural rubber latex and utilizing a chemical stabilizer of the type similar to branched dodecyl benzene sulphonic acid alone or in combination with other stabilizers such as a sulfated fatty acid in combination with hydroxypropyl methylcellulose is disclosed. Also disclosed is a treatment of natural rubber latex with antioxidants either alone or together which ether serve to allow natural rubber latex products to be chlorinated without suffering debilitating aging effects. The first antioxidant is of the type 4,4-(6-T-butyl-M-cresol) or 4,4+-Butylidenebis (3-methyl-6-tert-butylphenol) while the second antioxidant is of the type of a polymeric hindered phenol or butylated reaction product of P-cresol and dicyclopentadiene.

17 Claims, 6 Drawing Sheets

FIGURE 1. TWO-WAY STABILIZER SYSTEM: 9 DAYS AFTER ENZYME TREATMENT

FIGURE 2. TWO-WAY STABILIZER SYSTEM: 56 DAYS AFTER ENZYME TREATMENT

FIGURE 3. TWO-WAY STABILIZER SYSTEM: 118 DAYS AFTER ENZYME TREATMENT

FIGURE 4. THREE-WAY STABILIZER SYSTEM: 3 DAYS AFTER ENZYME TREATMENT

FIGURE 5. THREE-WAY STABILIZER SYSTEM: 55 DAYS AFTER ENZYME TREATMENT

FIGURE 6. THREE-WAY STABILIZER SYSTEM: 117 DAYS AFTER ENZYME TREATMENT

ENZYME, STABILIZER AND ANTIOXIDANT TREATED NATURAL RUBBER LATEX PRODUCT AND METHOD OF PROCESSING SAME

FIELD OF THE INVENTION

This invention relates to natural rubber latex (NRL) which has been deproteinized, relative to antigenic proteins, utilizing an enzyme treatment and to a method for accomplishing same utilizing a natural rubber latex stabilizer. In another embodiment, the invention features a combination of antioxidants what allow for chlorination processing of enzyme treated natural rubber latex.

BACKGROUND OF THE INVENTION

Natural rubber latex products are found almost everywhere in the world. Natural rubber latex is used in various industrial, commercial, medical and home applications. Medical products made of natural rubber latex include exam and surgical gloves, anesthesia masks and bags, catheters, injection ports, dental damns, condoms, diaphragms, balloons and blood pressure cuffs. Non-medical products made of NRL include toy balloons, household gloves, and foam mattresses and pillows. During the manufacturing process of many of these products, proteins, which occur naturally in natural rubber latex, can migrate to the surface of the latex film.

It has recently been reported that some humans appear to suffer an allergic reaction, of varying intensity, to natural rubber latex. It is believed that the allergic reaction is a result of the naturally-occurring proteins in natural rubber latex.

Accordingly, several attempts at removing proteins from products made of natural rubber latex have been developed. One such method includes a water leaching process. Although the water leaching process removes many of the surface proteins, measurable amounts of proteins still remain. Since antigenic proteins may be one source of allergens, manufacturers are continuing to modify the manufacturing process of rubber goods in such a way to attempt to reduce protein levels.

Another approach, aimed at reducing the allergenicity of latex antigenic proteins, is that of treating natural rubber latex with proteolytic enzymes to digest the proteins into smaller and potentially less allergenic pieces. Although this method is not meant to be a cure all to latex allergy, it may be a practical approach to reducing latex allergens to tolerable levels.

Proteolytic enzymes, also called proteases and proteinases, have found wide use in the food processing industry. Proteases are used to improve elasticity of dough in baked products; to break up barley proteins and improve product stability in the brewing industry; to aide in digesting milk proteins during the cheese manufacturing process; to tenderize meat; and are used in detergents to treat protein stains on clothing. Additional information concerning enzyme-treated natural rubber latex products and the method for doing same can be found in a report entitled "Enzyme-Treated Natural Rubber Latex: A Practical Approach" by Frank- W. Perrella, Ph.D., Jul. 21–22, 1998, and "Enzyme-Treated Natural Rubber Latex: Concept to Product" by Frank W. Perrella, Ph.D., Jul. 27–28, 1999, which is fully incorporated herein by reference.

In order for the enzyme action to work appropriately on the natural rubber latex, the natural rubber latex solution must be kept at a temperature which is defined by the enzyme being utilized to treat the natural rubber latex. As is well known in the rubber industry, one step in making latex products and specifically, latex medical products, foam mattresses and pillows, and toy balloons requires the addition of stabilizers during the manufacturing process. It has been discovered that the use of standard practices for stabilizing latex before enzyme treatment often results in an unstable material or unwanted coagulation or hardening of the natural rubber latex into a ball-like substance or other undesirable qualities in the finished product. Accordingly, it has been found that the use of various chemical stabilizers during the enzyme treatment of natural rubber latex product maintains the desirable qualities in the latex and the finished product.

Even after deproteinization of latex using such enzyme treatment methods, it has been found to be desirable in latex products to use a water extraction process to reduce the water extractable protein content both with and without enzyme or other deproteinization processes. One such method includes chlorinating the natural rubber latex products, such as medical or household gloves, catheters, and toy balloons made from deproteinized natural rubber latex. In addition, chlorination allows the ability to produce powder-free medical gloves, household gloves and catheters.

On some thicker products, such as catheters and household gloves, chlorination has minimal effects on the physical properties of the material due to the thick physical profile of these products. However, when chlorination is applied to medical gloves, balloon catheters, or toy balloons having a thickness of approximately 0.2 mm and below, chlorination often results in the gloves having poor physical properties particularly after high temperature aging. Poor physical properties for medical gloves results in gloves that have a very short shelf life and suboptimal barrier properties before being unusable due to the premature aging caused by the chemical reaction on rubber during the chlorination step. Accordingly, a method of preventing premature aging of natural rubber latex products caused by oxidation of the chlorination process is also desirable and a feature of the present invention.

SUMMARY OF THE INVENTION

The present invention features a novel method and process for manufacturing enzyme-treated natural rubber latex and products made from such treated natural rubber latex. One feature of the present invention is the use of a branched or isomeric chemical form of the stabilizer dodecyl benzene sulphonic acid either alone or in combination with one or two other stabilizers such as, sulfated fatty acids or a low viscosity grade (less than 100 centipoise) chemically modified cellulose such as hydroxypropyl- or hydroxyethyl-methylcellulose.

Another feature of the present invention is a treatment of enzyme-treated natural rubber latex with a combination of antioxidants to allow for chlorination of enzyme-treated latex products, such as gloves, catheters, and toy balloons. In this embodiment, satisfactory chlorinated natural rubber latex medical gloves can be made with enzyme-treated latex with the proper addition of one or two antioxidants that maintain the desired physical properties of the gloves, and improve aging and shelf life. The first antioxidant type is of the chemical composition of 4,4-Butylidenebis (6-T-butyl-M-cresol) or 4,4+-Butylidenebis (3-methyl-6-tert-butylphenol); while the second antioxidant is a polymeric hindered phenol or butylated reaction product of P-cresol and dicyclopentadiene.

BRIEF DESCRIPTION OF THE DRAWINGS

These, and other features of the present invention will be better understood by reading the following detailed description taken together with the figures wherein.

DETAILED DESCRIPTION OF THE PREFERRED EMBODIMENT

The present invention will be explained in connection with the manufacture of medical gloves made from enzyme-treated natural rubber latex, although it is understood that this is not a limitation of the present invention. Additionally, the present invention will be explained relative to one manufacturing process, although this is also not a limitation of the present invention as the combination of stabilizers and combination of antioxidants disclosed by the present invention can be used in various NRL manufacturing processes without departing from the scope of the present invention.

In the exemplary method, raw centrifuged or creamed natural rubber latex is received with a dry rubber content of 55 to 68%, typically 62%. To prepare the latex for enzyme treatment, water is used to dilute the latex to 40 to 60% solids, preferably 55 to 60%. Chemical stabilizers are added to the diluted latex prior to enzyme addition. First, sodium or potassium hydroxide is added to the latex as a stabilizer, usually in the range of 0.05 to 0.5 phr, preferably 0.1 phr. In addition to sodium or potassium hydroxide, Stabilizer B, Stabilizer A or a combination of both Stabilizer A and B, is added to the diluted latex. In addition, each constituent stabilizer of the group of Stabilizer A may be used individually.

Stabilizer A is a combination of a low viscosity chemically modified cellulose such as hydroxypropyl- or hydroxyethyl-methylcellulose (Methocel E15, Dow Chemical Co., less than 100 centipoise) and a sulfated fatty acid (Modicol S, Diamond Shamrock Chemicals Co. or Henkel). Stabilizer B is a dodecyl benzene sulphonic acid (EM-99 or LAS-99, Pilot Chemical Co.), preferably a branched chain dodecyl benzene sulphonate, which has been made alkaline with a caustic material, such as sodium hydroxide. Stabilizer A generally consists of 0.1 to 1.0 phr of sulfated fatty acid, preferably 0.6 phr, and 0.01 to 0.5 phr of a hydroxypropyl methylcellulose, preferably 0.175 phr. Stabilizer generally contains 0.1 to 1.0 phr of alkaline branched dodecyl benzene sulphonic acid, preferably 0.8 phr. Stabilizers A and B in combination contain 0.1 to 1.0 phr of sulfated fatty acid, 0.01 to 0.5 phr of a hydroxypropyl methylcellulose, and 0.1 to 1.0 phr of an alkaline dodecyl benzene sulphonic acid, preferably 0.15 to 0.30 phr, 0.02 to 0.06 phr, and 0.2 to 0.4 phr, respectively.

Once the stabilizer (s) has (have) been mixed into the diluted latex, the stabilized latex is brought to a temperature between 55° F. and 140° F., preferably 80 to 100° F. This temperature is dictated by and dependent upon the choice of enzyme. When the treatment temperature is reached, a bacterial alkaline protease (alkaline protease from fermentation of Bacillus such as subtilisin proteolytic enzyme) is added to degrade latex proteins. Other similar alkaline proteases from the Bacillaceae family of aerobic rod shaped gram-positive bacteria, such as Bacillus subtilis, lentus, or licheniformis can also be used.

In the exemplary method, the bacterial protease is added from a stock aqueous solution (the present invention also contemplates the use of dry bacterial protease) taken as 100% enzyme stock but containing only about 5 to 10% dry solids, and 2–5% protein to the pre-stabilized latex at a concentration generally between 0.1 to 1.0 phr, preferably 0.36 phr of the stock enzyme solution. This represents an actual protease protein concentration of generally 0.002 to 0.05%, preferably 0.01 to 0.03%. The protease is diluted with water generally to a 20 to 50% solution of the stock prior to adding it to the stabilized latex.

The latex compound is then agitated slowly (approximately 60 rpm) for a period of 6 to 120 hours to allow the protease to degrade the natural rubber latex proteins into smaller peptides and amino acids. The enzyme treated latex compound is maintained at the treatment temperature during the degradation period, or the temperature is allowed to ramp down to room temperature (approximately 65° F.) during this period.

At the end of the degradation period, the enzyme treated latex is compounded with vulcanizing chemicals to obtain the desired processing characteristics for producing a medical product such as a glove, as is well known in the art. The vulcanizing agents may include chemical accelerators, antioxidants, waxes, fatty acids, surfactants, and any other necessary processing agent. The resulting enzyme treated natural rubber latex compound is then used in the manufacture of rubber goods, such as, medical and household gloves, catheters, foam products, and toy balloons.

Some preliminary data supports the effectiveness of chlorination of enzyme and non-enzyme treated latex gloves when a combination of antioxidants are added to the latex. Note that this data applies to natural rubber latex gloves with a synthetic polymer coating on the inside surface made from enzyme treated latex and then chlorinated. The method is as follows:

Enzyme treated and stabilized natural rubber latex was compounded for vulcanization using the typical processing ingredients to obtain the desired thin film processing characteristics for producing a medical glove. The vulcanizing agents may include chemical accelerators, antioxidants, waxes, surfactants, and any other necessary processing agent. The resulting enzyme treated natural rubber latex compound is then used in the manufacture of medical gloves.

EXAMPLE 1

Chlorinated medical gloves can be made with enzyme treated latex with the proper addition of a combination of two distinct types of antioxidants that maintain the desired physical properties of the gloves and improve aging and shelf-life. The first antioxidant type is of the chemical composition of 4,4-Butylidenebis (6-T-butyl-M-cresol) or 4,4+-Butylidenebis (3-methyl-6-tert-butylphenol) and the second antioxidant is a polymeric hindered phenol or butylated reaction product of p-cresol and dicyclopentadiene. Examples of brand names for these two type of antioxidants are SantoWhite Powder or Lowinox 44B25 and Wingstay L or Octolite WL, respectively.

The first type of antioxidant is added to the latex either before or after enzyme treatment but preferably during the compounding stage at a concentration generally between 0.10 to 0.50 phr, preferably 0.15 phr of SantoWhite Powder or chemical equivalent. The second type of antioxidant is also added to the latex either before or after enzyme treatment but preferably during the compounding stage at a concentration generally between 0.5 to 1 phr, preferably 0.80 phr of Wingstay L or chemical equivalent. Medical gloves made from this enzyme treated latex compound are stable to chlorination generally between 500 ppm to 1800 ppm of chlorine, preferably 1200 ppm.

Physical Properties of Gloves after Heat Accelerated Aging at 70 C for 7 days

| Stabilizer | Chlorine Conc. (ppm) | Temp. of Chlorination | pH of Chlorination | Post Process Washed | Tensile Strength at Break psi | % Elongation at Break |
|---|---|---|---|---|---|---|
| A | 1330 | 88 F. | 2 | No | 2660 | 920 |
| B | 1775 | 88 F. | 2 | No | 2640 | 780 |
| A | 1300 | 88 f. | 2 | Yes | 2185 | 820 |
| B | 1775 | 88 F. | 2 | Yes | 3510 | 840 |

Chlorinated gloves made from enzyme treated latex that contained 0.15 phr of Lowinox 44B25 and 0.8 phr of Octolite WL were tested for heat aging (accelerated aging) at 70 C for 7 days as described in the ASTM standards D3578 either before or after post washing the gloves for 5 min. each in 1% sodium carbonate, water, and 0.25% silicone emulsion in water. All gloves made with the two antioxidant combination passed the ASTM aging requirements (minimum 2030 psi tensile strength at break, 500% ultimate elongation) for medical examination gloves.

EXAMPLE 2

Figure 1:
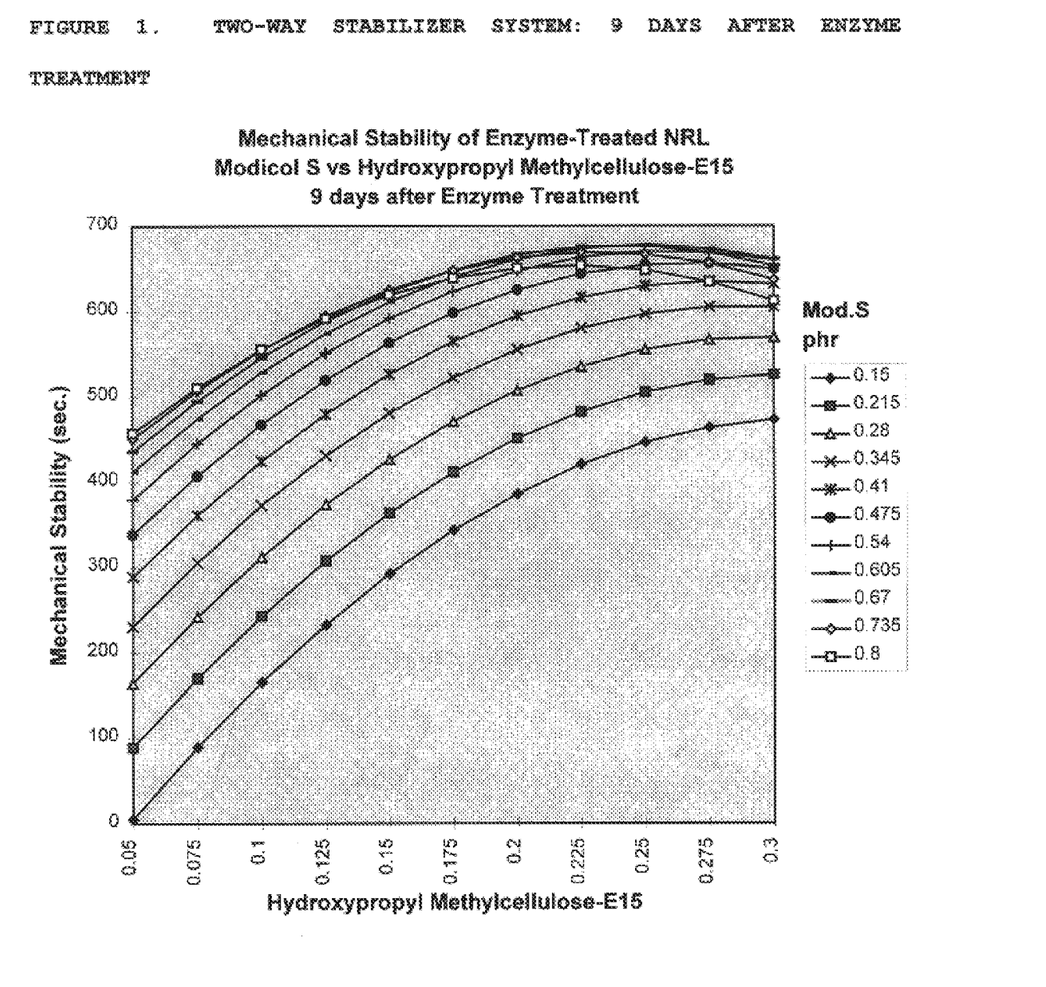
FIG. 1 is a graph of the stability of enzyme treated natural rubber latex 9 days after stabilization with two stabilizer as disclosed in one embodiment of the present invention.
Figure 2:
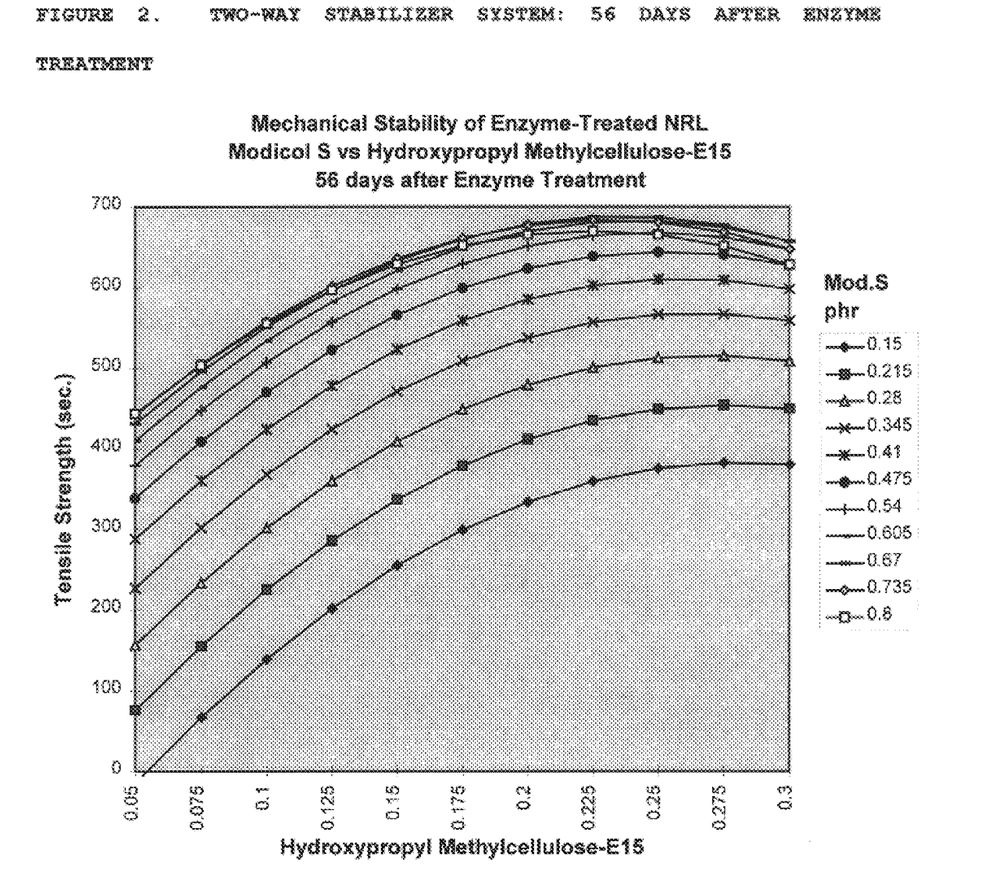
FIG. 2 is a graph of the stability of enzyme treated natural is rubber latex 56 days after stabilization with two stabilizers as disclosed in another embodiment of the present invention.
Figure 3:
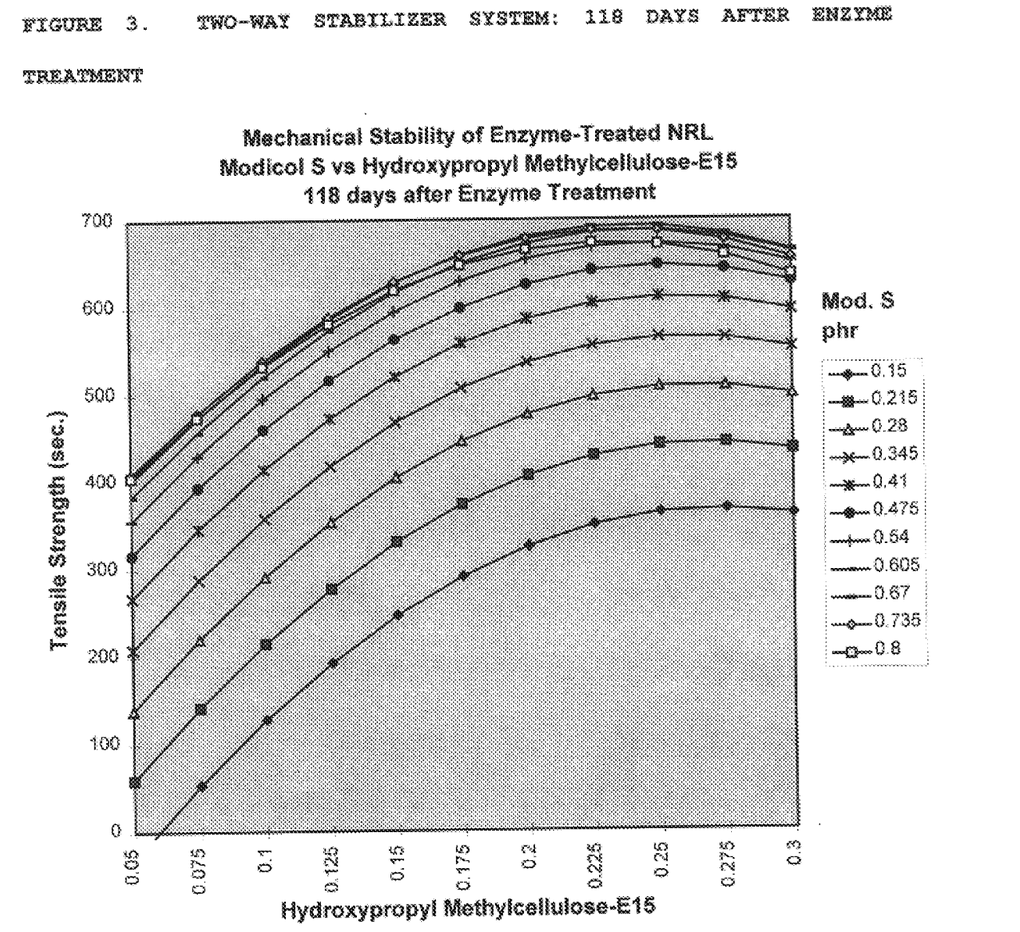
FIG. 3 is a graph of the stability of enzyme treated natural rubber latex 118 days after stabilization with two stabilizers as disclosed in another embodiment of the present invention.
Figure 4:
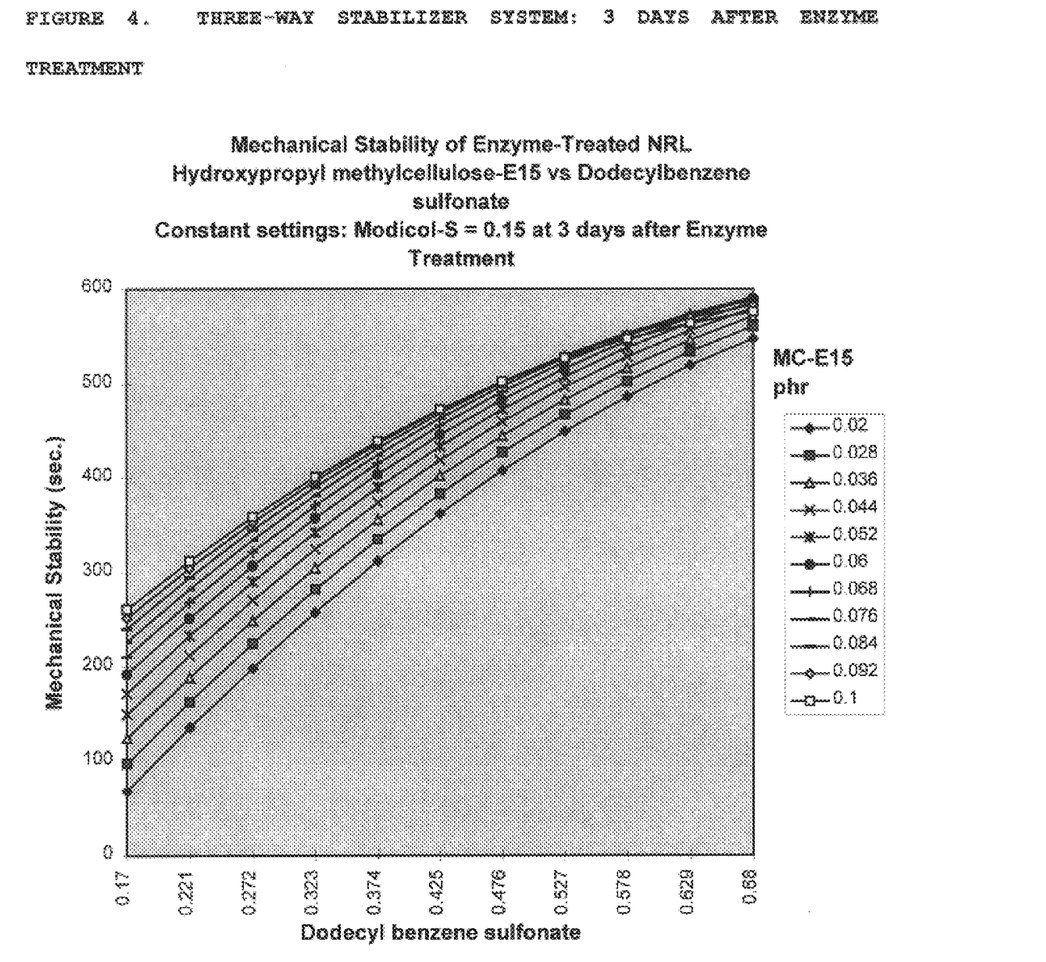
FIG. 4 is a graph of the stability of enzyme treated natural rubber latex 3 days after stabilization with three stabilizers as disclosed in yet another embodiment of the present invention.
Figure 5:
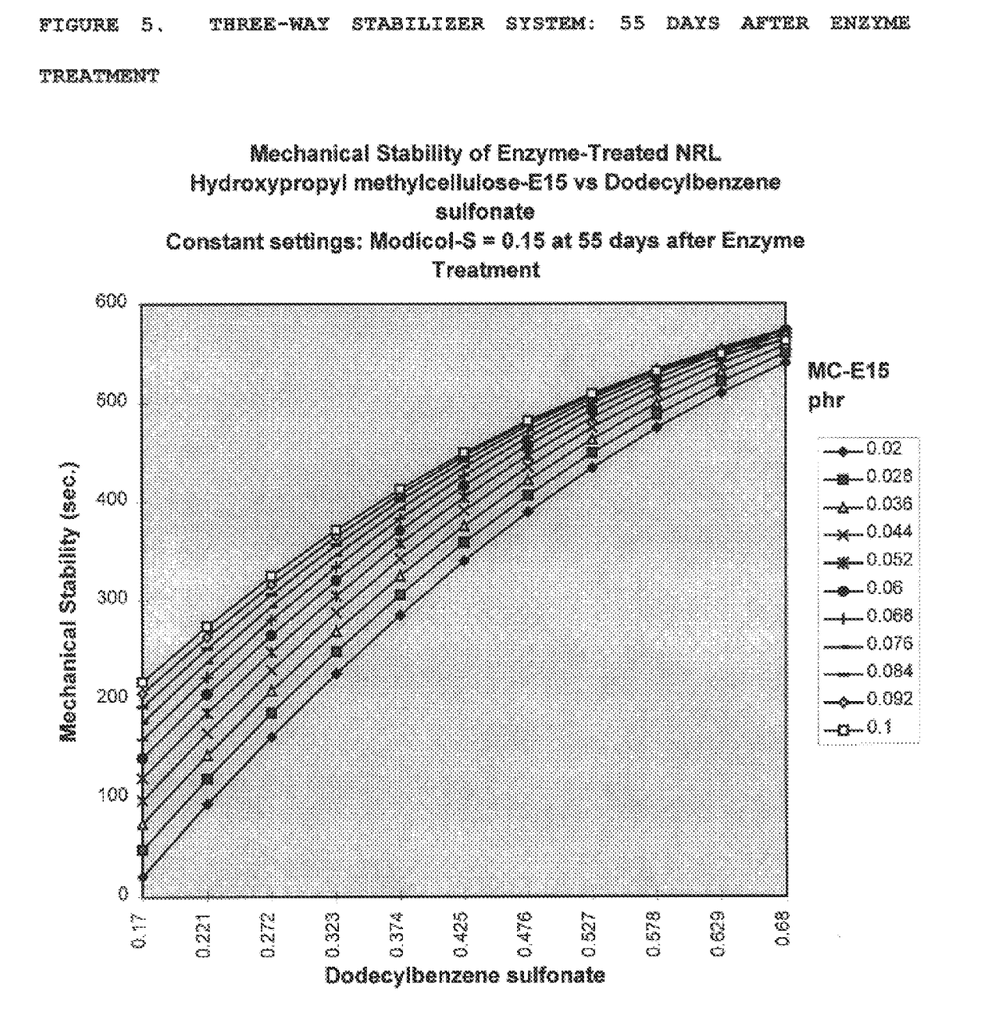
FIG. 5 is a graph of the stability of enzyme treated natural rubber latex 55 days after stabilization with three stabilizers as disclosed in yet another embodiment of the present invention.
Figure 6:
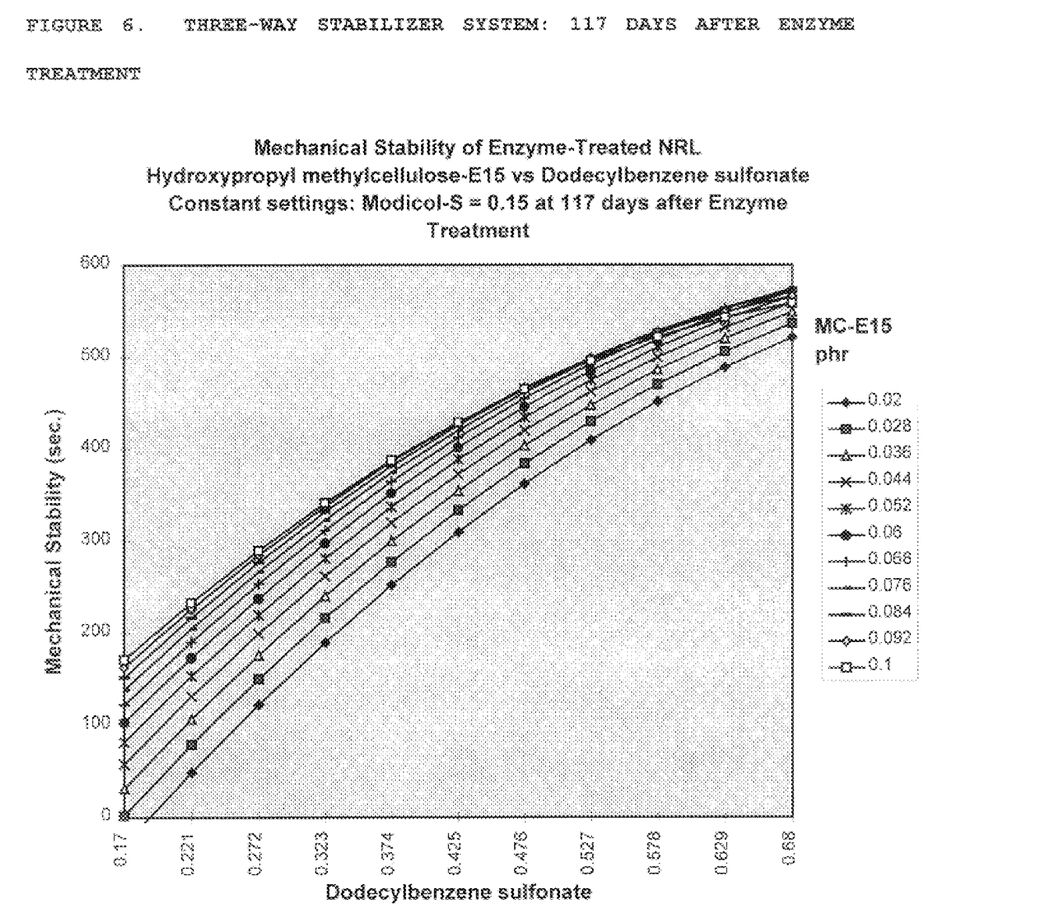
FIG. 6 is a graph of the stability of enzyme treated natural rubber latex 117 days after stabilization with three stabilizers as disclosed in yet another embodiment of the present invention.

Natural Rubber Latex (NRL) used for the manufacture of dipped latex goods is typically stable to mechanical agitation; such as that achieved by vigorous stirring at 1600 rpms using a mechanical blender. Protease treated NRL is typically much less stable than non-treated latex because the proteins impart a level of protection and stability to the rubber colloidal particles. Therefore, enzyme treated NRL must be stabilized by the addition of stabilizing soaps and surfactants. A mechanical stability test was performed by placing the latex in a container and vigorously stirring for at least 600 seconds using a rotating blade. Using this test, mechanical stability of at least 250 seconds is considered stable. The addition of Stabilizer A (FIGS. 1 to 3) or a combination of Stabilizers A and B (FIGS. 4 to 6) markedly improves the mechanical stability of enzyme treated NRL in a concentration (parts per hundred, phr) dependent manner.

EXAMPLE 3

Natural rubber latex was sampled prior to enzyme treatment (0 hr.) and separated into two containers for addition of KOH, and either Stabilizer A, Stabilizer B, or a combination of Stabilizers A and B. The latex containers were brought to the treatment temperature, and stock enzyme solution was added at the preferred concentration of 0.36 phr. Each enzyme-treated latex container was agitated slowly for 24 hours, at which time latex samples were obtained from each container.

Each latex sample was tested for antigenic protein using an ELISA immunologic test method for antigenic latex proteins and the RAST Inhibition immunologic test method for latex protein allergens. Following the 24 hour protein degradation period, each latex container was compounded with standard vulcanizing agents. Gloves were manufactured from the same lot of latex that was enzyme treated and compounded. The resulting gloves were tested for antigenic/allergenic protein using the ELISA and RAST Inhibition test methods. There was at least a 95 percent reduction in antigenic protein content in the raw NRL following enzyme treatment with Stabilizers A, B, or a combination of A and B. The residual aqueous extractable antigenic protein content of glove products made of enzyme treated latex was less than 10 micrograms per gram rubber product.

Antigenic and Allergenic Protein Content of Enzyme Treated Latex

| | ELISA Antigenic Proteins ($\mu g/g$) Stabilizer A or B | ELISA Antigenic Proteins ($\mu g/g$) Stabilizer A & B | % Decrease in Antigenic Proteins | RAST Inhibition Allergenic Proteins ($\mu g/g$) Stabilizer A or B | RAST Inhibition Allergenic Proteins ($\mu g/g$) Stabilizer A & B | % Decrease in Allergenic Proteins |
|---|---|---|---|---|---|---|
| RAW LATEX: | | | | | | |
| 0 hr Control (no enzyme treatment) | 6410 | 37,177 | N/A | 7253 | 1201 | N/A |
| 24 hr Enzyme Treated w/Stabilizer A | 130 | N/A | 98% | 66 | N/A | 99% |
| 24 hr Enzyme Treated w/Stabilizer B | 53 | N/A | 99% | 72 | N/A | 99% |
| 24 hr Enzyme Treated w/Stabilizer A & B | N/A | 294 | 99% | N/A | 58 | 95% |
| GLOVES: | | | | | | |
| 24 hr Enzyme Treated w/Stabilizer A | 1.0 | N/A | N/A | 8.1 | N/A | N/A |
| 24 hr Enzyme Treated w/Stabilizer B | 1.7 | N/A | N/A | Below Detection | N/A | N/A |
| 24 hr Enzyme Treated w/Stabilizer A & B | N/A | Below Detection | N/A | N/A | 8.1 | N/A |

Accordingly, the present features a process for stabilizing enzyme treated natural rubber latex by using a combination of three chemical stabilizers which is novel to such a process. A natural rubber latex product made by such a process is low in protein antigens and allergens and can easily and repeatedly be manufactured. Further, the present invention features the use of a novel combination of antioxidants which allow for the manufacture of chlorinated natural rubber latex products (with or without enzyme treatment) that do not exhibit premature aging and shortened shelf life due to the chlorination reactions.

Modifications and substitutions by one of ordinary skill in the art are considered to be within the scope of the present invention which is not to be limited except by the claims.

What is claimed is:

1. A method for producing stabilized, enzyme-treated, non-deproteinized natural rubber latex, said method comprising the step of treating enzyme-treated, non-deproteinized natural rubber latex with at least two stabilizers selected from the group consisting of an alkylbenzenesulfonate derivative stabilizer, a sulfated fatty acid stabilizer and a low viscosity chemically modified cellulose derivative stabilizer.

2. The method for producing stabilized, enzyme-treated, non-deproteinized natural rubber latex of claim 1 wherein said alkylbenzenesulfonate derivative stabilizer is a dodecyl benzene sulfonic acid stabilizer and said low viscosity chemically modified cellulose derivative stabilizer is a low viscosity hydroxypropyl methylcellulose stabilizer.

3. The method for producing stabilized, enzyme-treated, non-deproteinized natural rubber latex of claim 1 wherein said step of treating said enzyme-treated, non-deproteinized natural rubber latex with at least two stabilizers includes treating said enzyme-treated, non-deproteinized natural rubber latex with all three stabilizers selected from the group consisting of an alkylbenzenesulfonate derivative stabilizer, a sulfated fatty acid stabilizer and a low viscosity chemically modified cellulose derivative stabilizer.

4. The method of claims 1, 2 or 3 further including the step of treating said enzyme-treated, non-deproteinized natural rubber latex with at least one antioxidant selected from the group consisting of the chemical composition 4,4-(6-T-butyl-M-cresol) or 4,4+-Butylidenebis (3-methyl-6-tert-butylphenol) and a polymeric hindered phenol or butylated reaction product of P-cresol and dicyclopentadiene.

5. A method for producing stabilized, enzyme-treated non-deproteinized natural rubber latex having reduced antigenic protein content comprising the steps of:

treating said enzyme-treated non-deproteinized natural rubber latex with a proteolytic enzyme; and treating said natural rubber latex with at least two stabilizers selected from the group consisting of an alkylbenzenesulfonate derivative stabilizer, a sulfated fatty acid stabilizer and a low viscosity chemically modified cellulose derivative stabilizer.

6. The method for producing stabilized, enzyme-treated non-deproteinized natural rubber latex of claim 5 wherein said alkylbenzenesulfonate derivative stabilizer is a dodecyl benzene sulfonic acid stabilizer and said low viscosity chemically modified cellulose derivative stabilizer is a low viscosity hydroxypropyl methylcellulose stabilizer.

7. The method for producing stabilized, enzyme-treated non-deproteinized natural rubber latex of claim 5 wherein said step of treating said enzyme-treated, non-deproteinized natural rubber latex with at least two stabilizers includes treating said enzyme-treated, non-deproteinized natural rubber latex with all three stabilizers selected from the group consisting of an alkylbenzenesulfonate derivative stabilizer, a sulfated fatty acid stabilizer and a low viscosity chemically modified cellulose derivative stabilizer.

8. The method of claims 5, 6 or 7 further including the step of treating said enzyme-treated, non-deproteinized natural rubber latex with at least one antioxidant selected from the group consisting of an antioxidant of the chemical composition 4,4-(6-T-butyl-M-cresol) or 4,4+-Butylidenebis (3-methyl-6-tert-butylphenol), and a polymeric hindered phenol or butylated reaction product of P-cresol and dicyclopentadiene antioxidant.

9. A process for the antioxidant treatment of enzyme-treated, non-deproteinized natural rubber latex comprising the steps of treating enzymo-treated, non-deproteinized natural rubber latex with a combination of first and second antioxidants of which the first is of the chemical composition of 4,4-(6-T-butyl-M-cresol) or 4,4+-Butylidenebis (3-methyl-6-tert-butylphenol) and the second is a polymeric hindered phenol or butylated reaction product of P-cresol and dicyclopentadiene.

10. An enzyme-treated, non-deproteinized natural rubber latex product produced according to the method of claims 1, 2, 3, 5, 6, 7, or 9.

11. A method for producing stabilized, non-deproteinized natural rubber latex having a 95% or greater reduction in antigenic protein content, said method comprising the step of treating said non-deproteinized natural rubber latex having a 95% or greater reduction in antigenic protein content with at least two stabilizers selected from the group consisting of an alkylbenzenesulfonate derivative stabilizer, a sulfated fatty acid stabilizer and a low viscosity chemically modified cellulose derivative stabilizer.

12. The method for producing stabilized, non-deproteinized natural rubber latex of claim 11 wherein said alkylbenzenesulfonate derivative stabilizer is a dodecyl benzene sulphonic acid stabilizer and said low viscosity chemically modified cellulose derivative stabilizer is a low viscosity hydroxypropyl methylcellulose stabilizer.

13. The method for producing stabilized, non-deproteinized natural rubber latex of claim 11 wherein said step of treating said non-deproteinized natural rubber latex with at least two stabilizers includes treating said non-deproteinized natural rubber latex with all three stabilizers selected from the group consisting of an alkylbenzenesulfonate derivative stabilizer, a sulfated fatty acid stabilizer and a low viscosity chemically modified cellulose derivative stabilizer.

14. The method of claims 11, 12 or 13 further including the step of treating said non-deproteinized natural rubber latex with at least one antioxidant selected from the group consisting of an antioxidant of the chemical composition 4,4-(G-T-butyl-M-cresol) or 4,4+-Butylidenebis (3-methyl-6-tert-butylphenol), and a polymeric hindered phenol or butylated reaction product of P-cresol and dicyclopentadiene antioxidant.

15. The method of claims 11, 12 or 13 further including the step of treating said non-deproteinized natural rubber latex with a combination of first and second antioxidants of which the first is of the chemical composition 4,4-(6-T-butyl-M-cresol) or 4,4+-Butylidenebis (3-methyl-6-tert-butylphenol) and the second is a polymeric hindered phenol or butylated reaction product of P-cresol and dicyclopentadiene.

16. A process for the antioxidant treatment of non-deproteinized natural rubber latex Comprising the steps of treating non-deproteinized natural rubber latex having a 95% or greater reduction in antigenic protein with a combination of first and second antioxidants of which the first is of the chemical composition of 4,4-(6-T-butyl-M-cresol) or 4,4+-Butylidenebis (3-methyl-6-tert-butylphenol) and the second is a polymeric hindered phenol or butylated reaction product of P-cresol and dicyclopentadiene.

17. A treated non-deproteinized natural rubber latex product having a 95% or greater reduction in antigenic protein produced according to the method of claims 11, 12, 13 or 16.

* * * * *